US008352386B2

(12) United States Patent  (10) Patent No.: US 8,352,386 B2
Chitiveli et al.  (45) Date of Patent: Jan. 8, 2013

(54) IDENTIFYING TRAINING DOCUMENTS FOR A CONTENT CLASSIFIER

(75) Inventors: Srinivas Varma Chitiveli, Germantown, MD (US); Barton Wayne Emanuel, Manassas, VA (US); Alexander Wolcott Holt, New Paltz, NY (US); Michael E. Moran, Ridgewood, NJ (US)

(73) Assignee: International Business Machines Corporation, Armonk, NY (US)

( * ) Notice: Subject to any disclaimer, the term of this patent is extended or adjusted under 35 U.S.C. 154(b) by 715 days.

(21) Appl. No.: 12/497,467

(22) Filed: Jul. 2, 2009

(65) Prior Publication Data

US 2011/0004573 A1  Jan. 6, 2011

(51) Int. Cl.
*G06F 15/18* (2006.01)
(52) U.S. Cl. ......................................................... 706/12
(58) Field of Classification Search ........................ None
See application file for complete search history.

(56) References Cited

U.S. PATENT DOCUMENTS

| | | | |
|---|---|---|---|
| 7,016,889 B2 * | 3/2006 | Bazoon ........................... | 706/48 |
| 2006/0143175 A1 * | 6/2006 | Ukrainczyk et al. .............. | 707/6 |
| 2007/0112753 A1 | 5/2007 | Liu et al. | |
| 2008/0071708 A1 | 3/2008 | Dara et al. | |
| 2008/0086433 A1 * | 4/2008 | Schmidtler et al. ............. | 706/12 |
| 2008/0154819 A1 | 6/2008 | Boies et al. | |

OTHER PUBLICATIONS

Thorsten, Joachims, "Transductive Inference for Text Classification Using Support Vector Machines", Proceedings of the International Conference on Machine Learning (ICML), 1999, pp. 1-10.*
Heymann, et al, "Social Tag Prediction," 31st Annual International ACM Special Interest Group on Information Retrieval (SIGIR'08) Conference, 2008. http://dububs.stanfor.edu:8090/pub/2008-18.
Sun, et al., "Conceptual Classification of Web Pages Using Bootstrapping and Co-Training Strategies," www.cais.ntu.edu.sg/axsun/paper/sun_cyberscape06.
Johannes Furnkranz, "Hyperlink Ensembles: a Case Study in Hypertext Classification," Information Fusion, vol. 3, Issue 4, Dec. 2002, pp. 299-312.
Ghani, et al., "Hypertext Categorization Using Hyperlink Patterns and Meta Data," Proceedings of ICML-01, 18th International Conference on Machine Learning, Williams College, US, 2001.

* cited by examiner

*Primary Examiner* — Kakali Chaki
*Assistant Examiner* — Luis Sitiriche
(74) *Attorney, Agent, or Firm* — Patterson & Sheridan, LLP (57) ABSTRACT

Systems, methods and articles of manufacture are disclosed for identifying a training document for a content classifier. One or more thresholds may be defined for designating a document as a training document for a content classifier. A plurality of documents may be evaluated to compute a score for each respective document. The score may represent suitability of a document for training the content classifier with respect to a category. The score may be computed based on content of the plurality of documents, metadata of the plurality of documents, link structure of the plurality of documents, user feedback (e.g., user supplied document tags) received for the plurality of documents, and document metrics received for the plurality of documents. Based on the computed scores, a training document may be selected. The content classifier may be trained using the selected training document.

24 Claims, 5 Drawing Sheets

IDENTIFYING TRAINING DOCUMENTS FOR A CONTENT CLASSIFIER

BACKGROUND OF THE INVENTION

1. Field of the Invention

The field of the invention relates to organizing content. More specifically, the field of the invention relates to identifying training documents for training a content classifier.

2. Description of the Related Art

Content classifiers classify documents into categories to facilitate locating information. Statistics based content classifiers need to continuously evolve to organize unstructured content into categories such that knowledge is easily found. To organize unstructured data, classification engines apply language analytics in conjunction with taxonomies to build customized knowledge bases that are fine-tuned for a particular group of users. Such knowledge bases store data representing statistical information, which associates unstructured content (e.g., a collection of documents web-pages, email messages, etc.) with categories in a logical and consistent manner. To attain high levels of accuracy and adapt to new concepts, the knowledge bases need to be periodically trained and updated so that over time, accurate and reliable categorization of unstructured data can be achieved.

Accurate and reliable categorization requires the building and maintaining of knowledge bases that correspond to specific fields of endeavor. Typically, to achieve this goal, analysts are hired to create initial knowledge bases with data that is already classified, and to periodically provide feedback to the knowledge bases to add new concepts or to adjust existing statistics to provide better classification. However, this leaves analysts with the daunting task of reviewing large quantities of documents to identify categories required to build the initial knowledge base. Further, the accuracy of deployed knowledge bases is limited to the domain knowledge possessed by the hired analysts and hence the results may be error prone or might not correspond to new concepts.

SUMMARY OF THE INVENTION

One embodiment of the invention includes a method for identifying training documents for a content classifier for a plurality of categories, the training being with respect to a category of the plurality of categories, the method comprising configuring one or more computer processors to perform an operation. The operation may generally include receiving a plurality of documents; identifying, from the received plurality of documents, one or more training documents to represent the category to use in training the content classifier; and training the content classifier using each identified document as a positive training example representing the category.

Another embodiment of the invention includes a computer-readable storage medium containing a program, which when executed by the processor is configured to perform an operation for identifying training documents for a content classifier for a plurality of categories, the training being with respect to a category of the plurality of categories. The operation may generally include receiving a plurality of documents; identifying, from the received plurality of documents, one or more training documents to represent the category to use in training the content classifier; and training the content classifier using each identified document as a positive training example representing the category.

Still another embodiment of the invention includes a system having a processor and a memory containing a program, which when executed by the processor is configured to perform an operation for identifying training documents for a content classifier for a plurality of categories, the training being with respect to a category of the plurality of categories. The operation may generally include receiving a plurality of documents; identifying, from the received plurality of documents, one or more training documents to represent the category to use in training the content classifier; and training the content classifier using each identified document as a positive training example representing the category.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Embodiments of the invention provide techniques for identifying content for building, training, and updating knowledge bases generated by classification engines, thereby reducing the dependence on business analysts, resulting in lower total cost for owning and operating such classification systems. In one embodiment, the classification engine may be statistical classifier. However, other classification engines/techniques may be used as well, e.g., learning classifiers (and similar systems such as a neural network). Once trained, the classifier may evaluate a given document to determine whether to include it in a "knowledge base," i.e., a group of documents identified by the trained classifier as "being" relevant to a particular category within a particular taxonomy.

In one embodiment, a scoring system may use a variety of different attributes to rank candidate documents (i.e., to rank documents which could be used as a training example for the content classifier). The resulting score is evaluated against a threshold to determine what content should be used to train the knowledge base for a content classifier directed to a particular category or taxonomy. That is, the score represents a measure of suitability for using a given document to train the content classifier with respect to a category. The scores for a given document may be computed based on user feedback related to the documents, document content, metadata, link structure, and other metrics. And the scoring system may identify training documents based on the computed scores.

Once identified, the content classifier may be trained using the documents with scores exceeding the threshold. Further, the scoring system may be used to maintain the content classifier over time. That is, over time, the scoring system may identify additional documents to use as training examples for the content classifier. Doing so allows the content classifier to remain current and retain the ability to accurately classify unstructured content as "belonging" to a particular category or taxonomy.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to/from the Internet and other networks. Such communications media, when carrying computer-readable instructions that direct the functions of the present invention, are embodiments of the present invention. Broadly, computer-readable storage media and communications media may be referred to herein as computer-readable media.

In general, the routines executed to implement the embodiments of the invention, may be part of an operating system or a specific application, component, program, module, object, or sequence of instructions. Computer programs implementing embodiments of the present invention typically include instructions that will be translated by a compiler into a machine-readable format and hence executable instructions. Also, such programs typically include variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Figure 1:
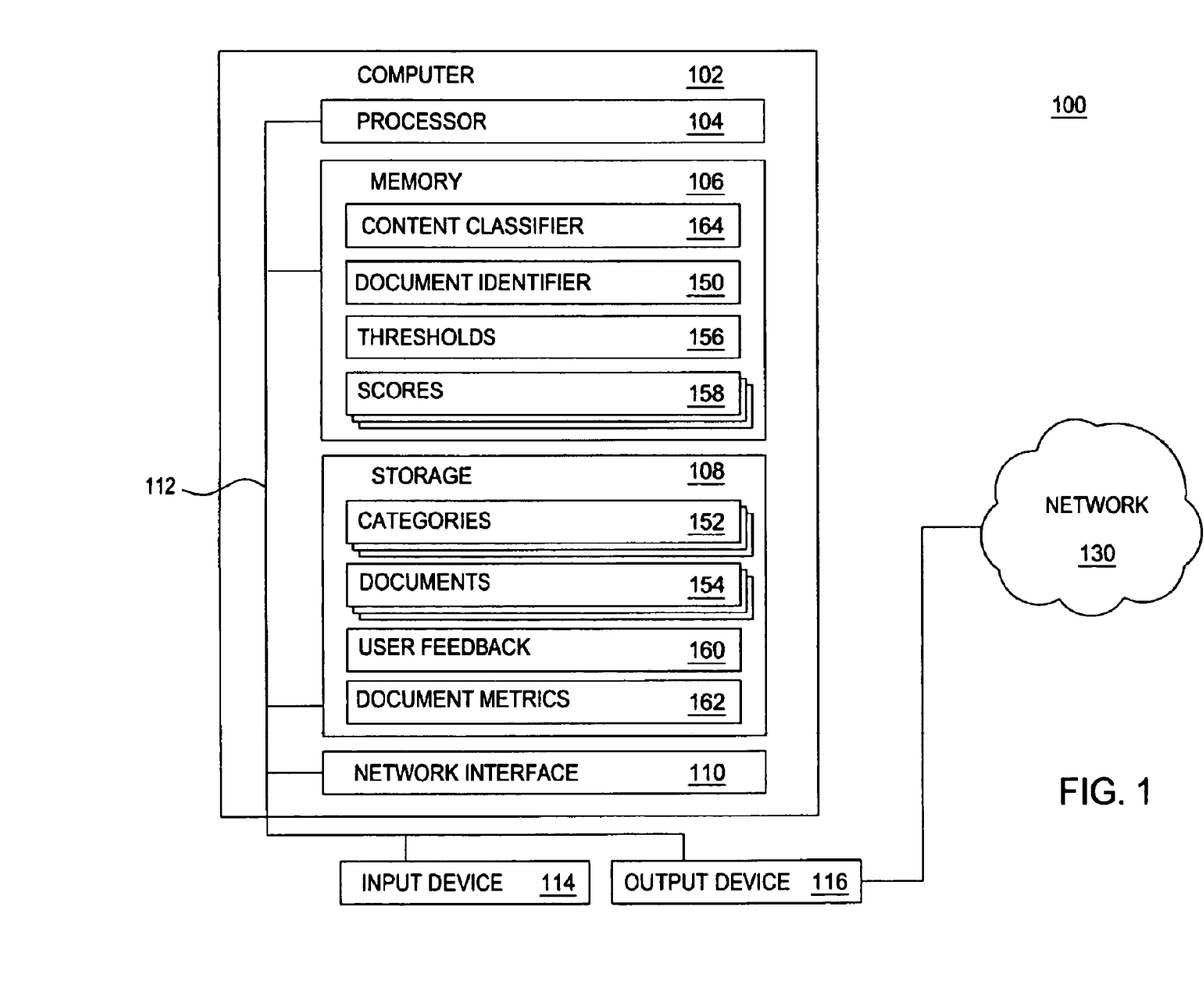
FIG. 1 is a block diagram illustrating a system for identifying training documents for a content classifier, according to one embodiment of the invention.

FIG. 1 is a block diagram illustrating a system 100 for identifying a training document for a content classifier, according to one embodiment of the invention. The networked system 100 includes a computer 102. The computer 102 is connected to other computers via a network 130. In general, the network 130 may be a telecommunications network and/or a wide area network (WAN). In a particular embodiment, the network 130 is the Internet.

The computer 102 generally includes a processor 104 connected via a bus 112 to a memory 106, a network interface device 110, a storage 108, an input device 114, and an output device 116. The computer 102 is generally under the control of an operating system (not shown). Examples of operating systems include UNIX, versions of the Microsoft Windows® operating system, and distributions of the Linux® operating system. (Note: Linux is at trademark of Linus Torvalds in the United States and other countries.) More generally, any operating system supporting the functions disclosed herein may be used. The processor 104 is included to be representative of a single CPU, multiple CPUs, a single CPU having multiple processing cores, and the like. Similarly, the memory 106 may be a random access memory. While the memory 106 is shown as a single entity, it should be understood that the memory 106 may comprise a plurality of modules, and that the memory 106 may exist at multiple levels, from high speed registers and caches to lower speed but larger DRAM chips. The network interface device 110 may be any type of network communications device allowing the computer 102 to communicate with other computers via the network 130.

The input device 114 may be any device for providing input to the computer 102. For example, a keyboard, keypad, light pen, touch-screen, track-ball, or speech recognition unit, audio/video player, and the like may be used. The output device 116 may be any device for providing output to a user of the computer 102. For example, the output device 116 may be any conventional display screen or set of speakers, along with their respective interface cards, i.e., video cards and sound cards (not shown). Although shown separately from the input device 114, the output device 116 and input device 114 may be combined. For example, a display screen with an integrated touch-screen, a display with an integrated keyboard, or a speech recognition unit combined with a text speech converter may be used.

The storage 108 may be a hard disk drive storage device. Although the storage 108 is shown as a single unit, the storage 108 may be a combination of fixed and/or removable storage devices, such as fixed disc drives, floppy disc drives, tape drives, removable memory cards, or optical storage. The memory 106 and the storage 108 may be part of one virtual address space spanning multiple primary and secondary storage devices.

As shown, the memory 106 of the computer 102 includes a content classifier 164, a document identifier 150, thresholds 156, and scores 158. Further, the storage 108 of the computer 102 includes categories 152, documents 154, user feedback 160, and document metrics 162. FIGS. 2 through 5 and associated descriptions detail the structure and operation of the document identifier 150 running on the computer 102.

Figure 2:
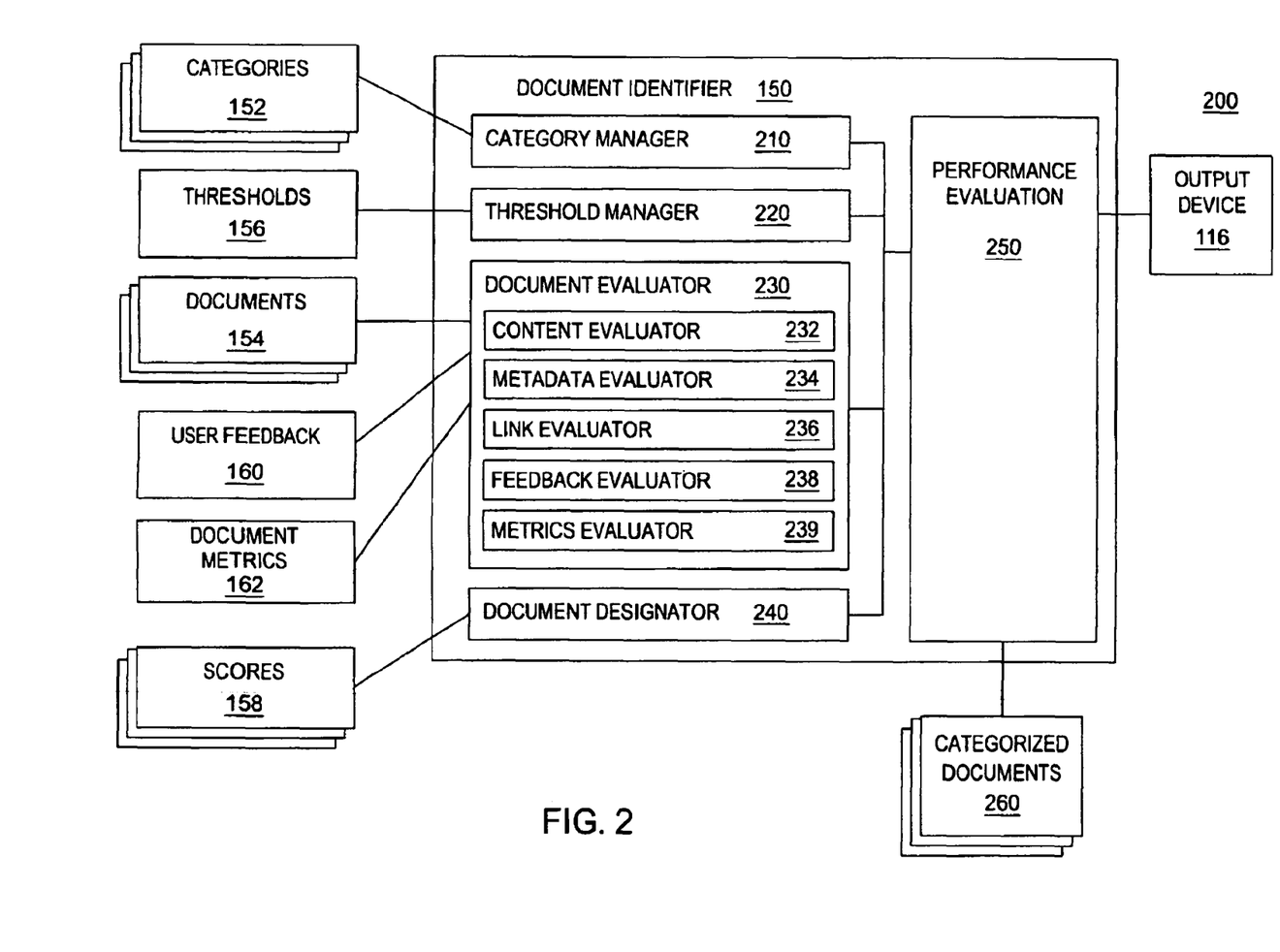
FIG. 2 is a block diagram illustrating components of a document identifier, according to one embodiment of the invention.

FIG. 2 is a block diagram 200 illustrating components of the document identifier 150 of FIG. 1, according to one embodiment of the invention. As shown, the document identifier 150 includes a category manager 210, a document evaluator 220, a threshold manager 230, a document designator 240, and a performance evaluator 250. Further, the document evaluator 220 includes a content evaluator 232, a metadata evaluator 234, a link evaluator 236, a feedback evaluator 238, and a metrics evaluator 239.

In one embodiment, the document identifier 150 evaluates documents to identify ones to use to train a content classifier 164. That is, each document identified by the document identifier 150 may be used as a training example for the content classifier 164. The "training" allows the content classifier 164 to recognize whether a given input document matches a particular category. Multiple classifiers may be trained, each using a set of documents selected by the document identifier as being representative of a distinct category. Alternatively, the content classifier 164 may generate multiple scores representing how well the document matches each of multiple categories. The classifier 164 may be a statistical classifier, a naive Bayes classifier, a linear classifier, learning or other type of classification engine adapted for use with an embodiment of the present invention (e.g., a neural network). However, not all documents will be effective as training documents for the content classifier 164. For example, a document, while being relevant to a particular category, may be poorly ranked by users or of little interest to users interested viewing documents about that category. In such a case, training the classifier using that document may lead to a classifier which performs poorly. In other words, training the content classifier 164 using the document may impair the ability of the content classifier 164 to effectively categorize documents 154.

In one embodiment, the category manager 210 provides a plurality of categories 152 for the content classifier 164. The content classifier 164 may categorize documents 154 into the provided plurality of categories 152. Table I shows illustrative categories 152:

TABLE I

| Categories example |
| --- |
| News articles |
| Sports |
| Entertainment |
| Politics |

In this specific example, the category manager 210 provides a plurality of categories 152 for news article documents. The plurality of categories 152 includes "Sports", "Entertainment", and "Politics". The content classifier 164 may categorize documents 154 (i.e., news articles in this case) into the Sports, Entertainment, or Politics categories. In one embodiment, the plurality of categories may also be hierarchical). For example, the Sports category may be associated with sub-categories of "Basketball" and "Baseball".

In one embodiment, the document evaluator 220 receives a plurality of documents 154 evaluated to identify which ones may be suitable training documents for the content classifier 164 for relative to one of the categories 152. Suppose a user desires to evaluate a plurality of documents 154 to identify one or more suitable training documents for the content classifier 164 with respect to the "Sports" category. Table II shows an example of set of documents to be valuated by the document evaluator 220:

TABLE II

| Documents example | |
| --- | --- |
| Document | Contents |
| Document D1 | Sports news article 1 |
| Document D2 | Sports news article 2 |
| Document D3 | Sports news article 3 |
| Document D4 | Entertainment news article |
| Document D5 | Political news article |

In this specific example, the plurality of documents 154 includes document D1, D2, and D3 (news articles related to sports), a document D4 (a news article related to entertainment), and a document D5 (a political news article). The document evaluator 220 may assess the plurality of documents using, e.g., metadata, link structure, user feedback 160, and document metrics 162, etc. The document evaluator 220 may also generate one or more component scores for each document 154 based on evaluating each different characteristic of a given document 154. Component scores be generated from the scores of different characteristics. The document evaluator 220 may compute a final score 158 for each document 154 based on the one or more component scores. For example, the document evaluator 220 may compute an arithmetical mean, a weighted mean, a sum, etc. Other ways of computing a final score 158 based on one or more component scores are broadly contemplated.

In one embodiment, the content evaluator 232 evaluates the documents 154 and computes a content component score for each document 154. Table III shows an example of content component scores for documents 154:

TABLE III

| Content evaluation example | |
| --- | --- |
| Document | Content component score |
| Document D1 | 75.0 |
| Document D2 | 85.0 |
| Document D3 | 80.0 |
| Document D4 | 20.0 |
| Document D5 | 15.0 |

In this specific example, the content evaluator 232 computes a content component score for each document 154 based on the content (that is, the actual text) of each document. For example, the content evaluator 232 may generate a term dictionary (or simply, "dictionary") for the Sports category. The dictionary may include a predefined plurality of words associated with the "Sports" category (for example, "referee", "playoffs", "elimination", "clutch" etc.). The content evaluator 232 may compute a higher score for document D2 than for document D3 if document D2 contains more words that match words of the dictionary for the "Sports" category. Other ways of computing a content component score based on content of a document 154 are broadly contemplated.

In one embodiment, the metadata evaluator 234 evaluates the documents 154 and computes a metadata component score for each document 154. Table IV shows an example of metadata component scores for documents 154:

TABLE IV

Metadata evaluation example

| Document | Metadata component score |
|---|---|
| Document D1 | 95.0 |
| Document D2 | 85.0 |
| Document D3 | 90.0 |
| Document D4 | 10.0 |
| Document D5 | 20.0 |

In this specific example, the metadata evaluator 234 computes a metadata component score for each document 154 based on the metadata of each document. For example, if the documents 154 are web pages, metadata of the documents 154 may include words in the <meta> and <title> HTML tags. The metadata evaluator 234 may compute a higher score for document D3 than for document D2 if document D3 includes metadata that contains more words that match words of the dictionary for the "Sports" category (for example, "referee", "playoffs", "elimination", "clutch" etc.). Other ways of computing a metadata component score based on metadata of a document 154 are broadly contemplated.

In one embodiment, the link evaluator 236 evaluates the documents 154 and computes a link component score for each document 154. Table V shows an example of link component scores for documents 154:

TABLE V

Link evaluation example

| Document | Link component score |
|---|---|
| Document D1 | 80.0 |
| Document D2 | 85.0 |
| Document D3 | 90.0 |
| Document D4 | 20.0 |
| Document D5 | 25.0 |

In this specific example, the link evaluator 236 computes a link component score for each document 154 based on link structure of each document 154. Link Structure may also influence the score for markup-based content, especially web-based content. Doing so relies on the assumption that more links to one document (e.g., a web-page), relative to others, the more likely that the document is representative of a subject (i.e., a given category or taxonomy).

In one embodiment, the link structure may include incoming links to each document 154 and any associated anchor text of the incoming links. For example, if the documents 154 are web pages, anchor text of a document 154 may include words within the <a> (i.e., anchor) HTML tag of incoming links (from other documents) to the document 154. In another embodiment, anchor text may be defined to include words surrounding an <a> tag (e.g., a paragraph that contains the link). The metadata evaluator 234 may compute a higher score for document D3 than for document D2 if an incoming link to document D3 includes anchor text that contains more words that match words of the dictionary for the Sports category (for example, an incoming link to document D3 may read "click here to read about the clutch play in the playoff elimination match").

Further, the metadata evaluator 234 may compute a higher score for document D3 than for document D2 if there are more incoming links to document D3 than for document D2 (i.e., according to the link structure of the documents 154).

In one embodiment, the feedback evaluator 238 receives user feedback 160 for the documents 154 and computes a feedback component score for each document 154. Table VI shows illustrative feedback component scores for documents 154:

TABLE VI

User feedback example

| Document | Feedback component score |
|---|---|
| Document D1 | 75.0 |
| Document D2 | 70.0 |
| Document D3 | 85.0 |
| Document D4 | 10.0 |
| Document D5 | 15.0 |

In this specific example, the feedback evaluator 238 computes a feedback component score for each document 154 based on received user feedback 160 for the documents 154. User feedback 160 may include social tagging systems and content rating systems. For example, a social tagging system allows one or more users to "tag" documents 154 with the keywords a given user characterizes a particular document. If many users tag a document with the same keyword, then the feedback component score for that keyword may be higher. In such a case, the feedback component may map the keyword to a particular classification category. Further Tagging a document 154 refers to associating the document 154 with one or more keywords, or "tags". The tags may be predefined by the social tagging system or specified by a user. Further, a content rating system allows one or more users to rate a document 154. By mapping taxonomy categories to tags, the document identifier 150 may utilize social tagging systems to determine which content belongs to a given category. Further, by adding quality measures for the content such as the number of users who have tagged the content, and, if available, the average user rating for the content, the document indenter 150 may select the best documents for training a given category.

For example, the feedback evaluator 238 may compute a higher score for document D3 than document D1 if the user feedback 160 for document D3 includes a greater number of relevant tags and/or a higher rating than the user feedback 160 for document D1. Further, the feedback evaluator 238 may also take into account other data associated with a tag (e.g., creation time, frequency, and number) in computing a feedback component score.

In one embodiment, the metrics evaluator 234 receives document metrics 162 for the documents 154 and computes a metrics component score for each document 154. Table VII shows illustrative metrics component scores for documents 154:

TABLE VII

Document metrics example

| Document | Metrics component score |
|---|---|
| Document D1 | 90.0 |
| Document D2 | 80.0 |
| Document D3 | 85.0 |
| Document D4 | 25.0 |
| Document D5 | 20.0 |

In this specific example, the metrics evaluator 234 computes a metrics component score for each document 154 based on received document metrics 162 for the documents 154. The document metrics 162 may include statistical data that describe a frequency with which each document 154 is accessed. For example, if the documents 154 are web pages, document metrics 162 may include a number of page views for each web page within a predefined time period (e.g., the last 3 months). For instance, the metrics evaluator 234 may compute a higher score for document D3 than for document D2 if the received document metrics 162 indicates that document D3 has received more views than document D2 in the last 3 months. Further, the frequency with which each document 154 is accessed may also be associated with a particular category.

In one embodiment, the document evaluator 220 computes a final score (or overall score) 158 for each document 154 based on the one or more component scores. For example, the document evaluator 220 may compute an arithmetic mean, a weighted mean, a sum, etc. Table VIII shows an example of final scores:

TABLE VIII

Final scores example

| Document | Final score (arithmetic mean) |
|---|---|
| Document D1 | 83.0 |
| Document D2 | 81.0 |
| Document D3 | 86.0 |
| Document D4 | 17.0 |
| Document D5 | 19.0 |

In this specific example, the document evaluator 220 computes, as a final score 158, an arithmetic mean of the component scores for each document 154 (that is, of Tables III-VII). In one embodiment, the document evaluator 220 may compute a final score 158 based on one or more parameters (in addition to the one or more component scores). Further, the document evaluator 220 may also configure one or more parameters based on user input. For example, the parameters may specify that the document evaluator 220 may compute final scores using a weighted mean instead of an arithmetic mean. Further, the parameters may specify weights for each component score (e.g., "2×" for the link component score and "3×" for the feedback component score, representing that the link component score and the feedback component score may be given twice and thrice the weight, respectively, relative to other component scores). Further, an effect of a component score may be nullified by setting an associated weight of the component score to zero. Other statistical calculations for compute a final score 158 based on one or more component scores are broadly contemplated.

In one embodiment, the threshold manager 230 defines one or more thresholds 156. The thresholds 156 specify criteria with which the document identifier 150 may select training documents from documents 154. Further, the thresholds 156 may be defined based on user input. Table IX shows an illustrative threshold:

TABLE IX

Threshold example

| Threshold | Value |
|---|---|
| Final score | 85.0 |

In this specific example, the threshold manager 230 defines a threshold of 85.0 for the final score of each document 154. That is, the document identifier 150 may select, as training documents, only those documents 154 having a final score exceeding the threshold of 85.0. For example, based on the threshold final score of 85.0, the document identifier 150 may select document D3 from Table VIII as a training document for the Sports category. Further, the threshold manager 230 may define a threshold that is specific to a component score. For example, the threshold manager 230 may define a threshold of 80.0 for the feedback component score. That is, documents 154 having feedback component scores not exceeding 80.0 may be disqualified from selection as a training document. In other words, a the document identifier 150 may apply a plurality of thresholds 156 in identifying suitable training documents for the content classifier 164. Other ways of defining thresholds for component scores and for overall scores are broadly contemplated.

In one embodiment, the document designator 240 may identify one or more training documents among the documents 154. The one or more training documents may be used to train the content classifier 164 for a given category 152. Table X shows an illustrative training document:

TABLE X

Training document example

| Document | Contents | Training document for "Sports"? |
|---|---|---|
| Document D1 | Sports news article 1 | No |
| Document D2 | Sports news article 1 | No |
| Document D3 | Sports news article 1 | Yes |
| Document D4 | Entertainment news article | No |
| Document D5 | Political news article | No |

In this specific example, the document designator 240 identifies document D3 (among documents D1 through D5) as a training document for the content classifier 164 with respect to the Sports category. The document designator 240 may select a document 154 as a training document based on the final scores 158 for the documents 154 and/or the thresholds 156. For example, the document designator 240 may select all documents 154 having final scores that meet the final score threshold 156. Alternatively, the document designator 240 may select training documents based on one or more parameters. The document designator 240 may configure the one or more parameters based on user input. For example, if a user specifies a parameter of "Top 5 documents", the document designator 240 may identify as training documents the documents 154 having the top five final scores, regardless of any threshold final score value. Other ways of identifying training documents based on final scores, component scores, thresholds, and/or parameters are broadly contemplated.

In one embodiment, the performance evaluator 250 evaluates categorized documents 260. A user may train the content classifier 164 using an identified training document (e.g., of Table X). In another embodiment, the document identifier 150 may train the content classifier 164 using identified training documents (e.g., of Table X). The performance evaluator 250 may receive documents 260 categorized by the content classifier 164. Further, the performance evaluator 250 may compute a score representing the accuracy of the content classifier 164 (i.e., in categorizing documents). For example, the performance evaluator 250 may compute a higher score if the content classifier 164 correctly categorizes a large proportion of documents into categories 152—as determined by a system administrator. That is, the classifier may be input a document for classification, and the administrator may review the results from the classifier. Further, documents misclassified by the classifier may be used as additional training examples. Further still, the performance evaluator may adjust thresholds 156 and/or parameters for component scores based on accuracy of the content classifier 164 in categorizing documents 154. For example, if a final score threshold of 80.0 instead of 85.0 yields superior performance by the content classifier 164, the performance evaluator may adjust the final score threshold to 80.0.

Figure 3:
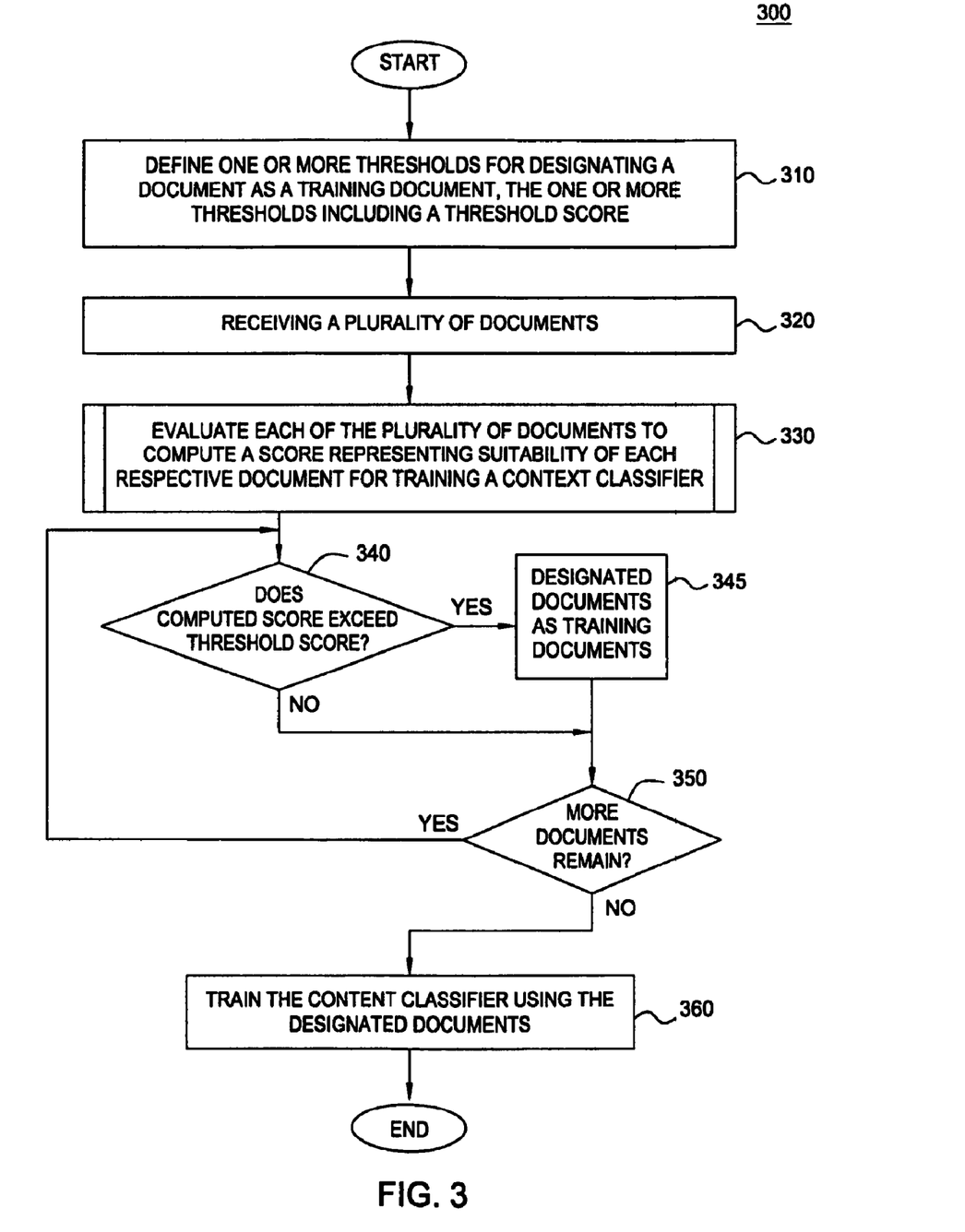
FIG. 3 is a flowchart depicting a method for identifying training documents for a content classifier, according to one embodiment of the invention.

FIG. 3 is a flowchart depicting a method 300 for identifying training documents for a content classifier 164, according to one embodiment of the invention. As shown, the method 300 begins at step 310, where the threshold manager 230 identifies thresholds for selecting a document to use in training a content classifier. The thresholds may typically be a configurable parameter of the document identifier 150 and tailored to suit the needs in a particular case.

At step 330, the document evaluator 220 evaluates each of the plurality of documents 154 to compute a score. The score represents how suitable each respective document 154 is for training a content classifier with respect to a category 152. Step 330 is further discussed below in conjunction with FIG. 4.

At step 340, the document designator 240 determines whether the computed final score 158 exceeds the threshold 156. If so, then at step 345, the document designator 240 designates the document as a training document.

At step 350, the document designator 240 determines whether more documents 154 remain. If so, the method 300 returns to step 340. Otherwise, the method 300 proceeds to step 360, where the document identifier 150 trains the content classifier 164 using the one or more designated training documents as positive training examples.

Figure 4:
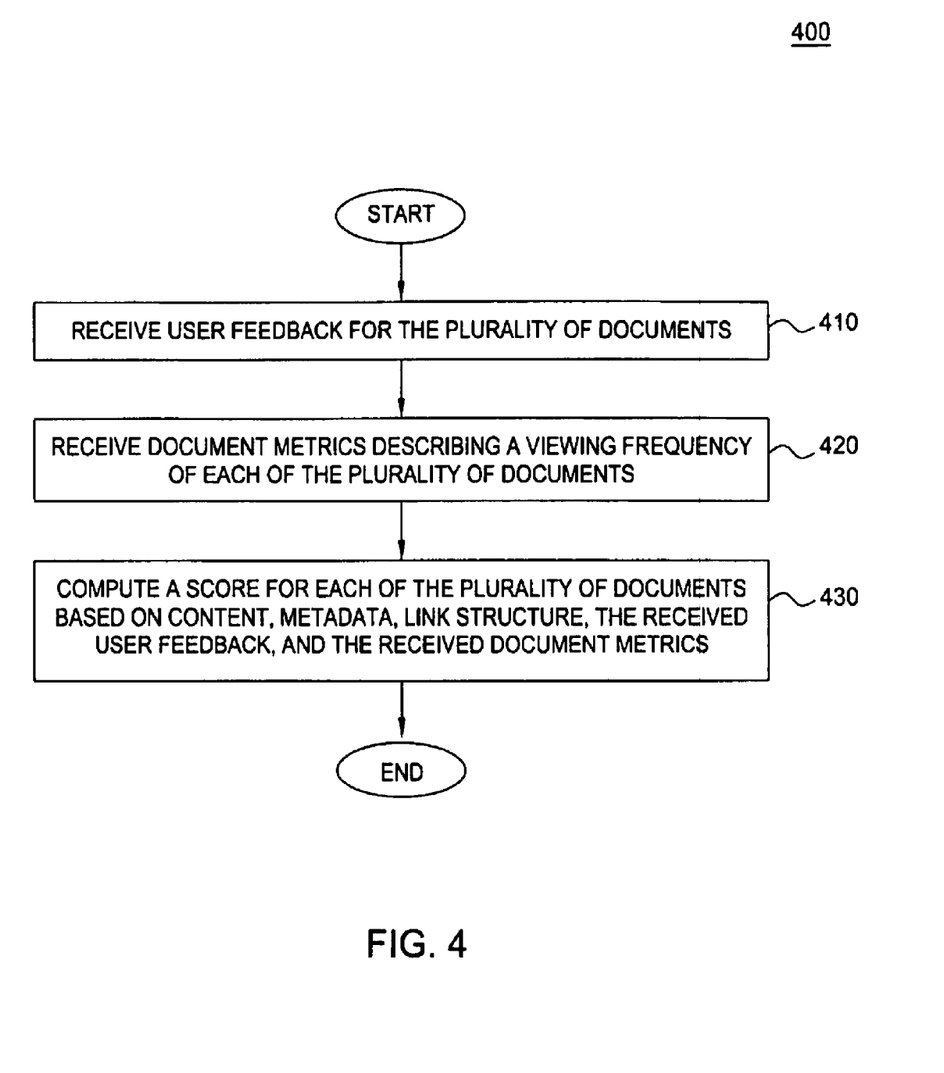
FIG. 4 is a flowchart depicting a method for evaluating a plurality of documents, according to one embodiment of the invention.

FIG. 4 is a flowchart depicting a method 400 for evaluating a plurality of documents 154 to compute a score representing suitability of each respective document for training a content classifier 164, according to one embodiment of the invention. The method 400 may be performed by the document evaluator 220 of FIG. 1. The steps of the method 400 correspond to step 330 of FIG. 3 and are described in conjunction with the final scores example of Table VIII and the component scores examples of Tables III through VII.

As shown, the method 400 begins at step 410, where the document evaluator 220 receives user feedback 160 for the plurality of documents 154. For example, the document evaluator 220 may receive data from a social tagging system and/or a content rating system. The data may include tags and/or ratings for each document 154. At step 420, the document evaluator 220 receives document metrics 162 for the documents 154. The document metrics may describe a viewing frequency of each document 154. The viewing frequency may also be with respect to a predefined time period, e.g., the last three months.

At step 430, the document evaluator 220 computes a score for each document 154 based on content of the documents 154, metadata of the documents 154, link structure of the documents 154, the received user feedback 160, and the received document metrics 162. For example, the document evaluator 220 may compute the scores of Table VIII. In computing a score for each document 154, the document evaluator 220 may also compute component scores. For example, the document evaluator 220 may compute the component scores of Tables III through VII. After step 430, the method 400 terminates.

Figure 5:
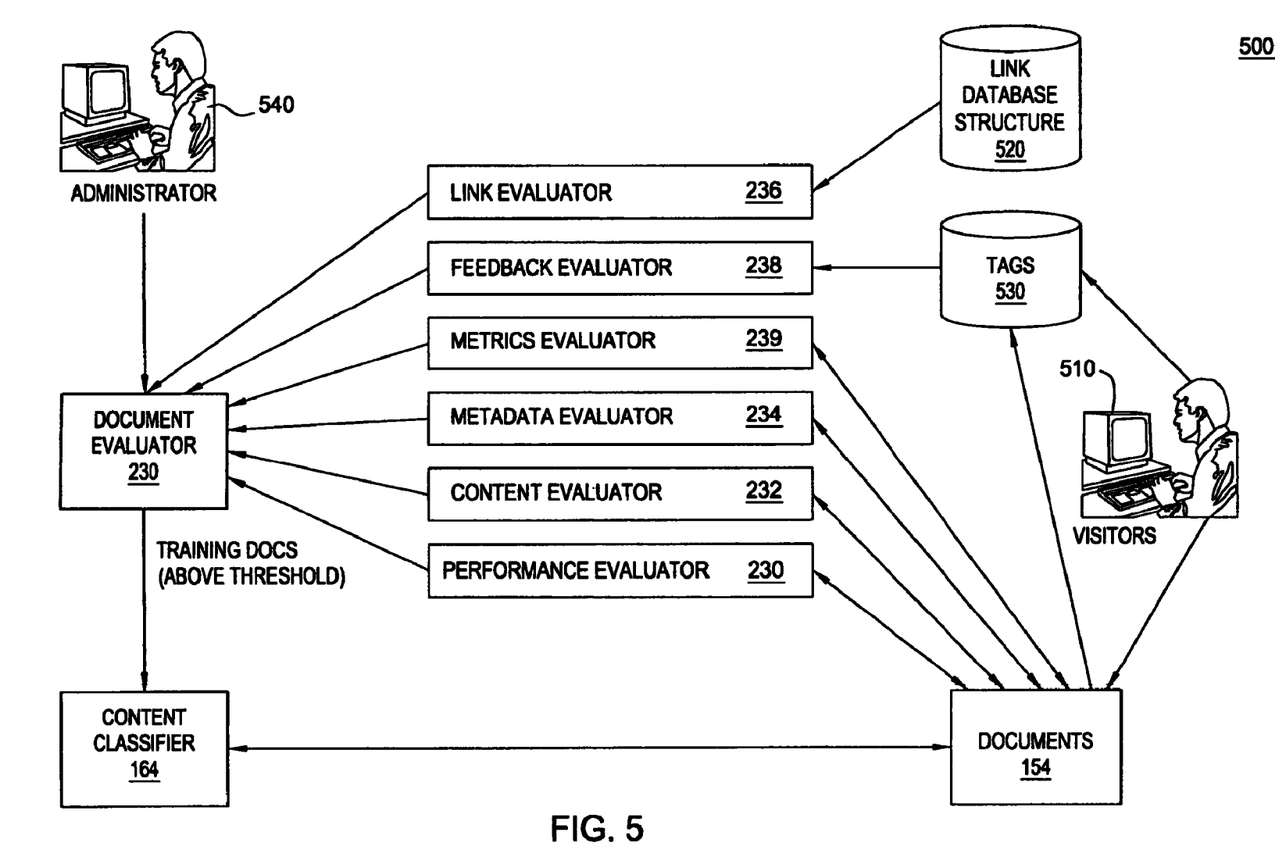
FIG. 5 is a data flow diagram illustrating a method for identifying training documents for a content classifier, according to one embodiment of the invention.

FIG. 5 is a data flow diagram 500 for identifying training documents for a content classifier 164, according to one embodiment of the invention. As shown, the data flow diagram includes visitors 510. Visitors may include users who access documents 154 (e.g., visitors to a web page). That is, users may select what terms are representative for the content of a particular document. As shown, the visitors 510 may input tags 530 for the documents 154. The users may also rate the overall content quality of a given document (either respect to a given tag or generally). Further, document metrics 162 may be updated to reflect what documents are accessed by a given user.

The link evaluator 236 determines a link component score based on the link structure database 520. Similarly, the feedback evaluator 238 determines a feedback component score based on the tags 530 supplied by a user. And the metrics evaluator 239 determines a metrics component score based on visits to the documents 154. Further still, the metadata evaluator 234 computes a metadata component score based on metadata of the documents 154. In addition, the content evaluator 232 computes a content component score based on the documents 154.

As shown, the document evaluator 230 may compute a final score 158 for each document 154 based on the link component score, the feedback component score, the metrics component score, the metadata component score, and the content component score. Further, a user, such as an administrator 540, may configure one or more thresholds and/or parameters of the document evaluator 230.

The content classifier 164 may be trained with one or more documents selected based on the final scores 158, according to one embodiment. In addition, the performance evaluator may compute a performance score based on accuracy of the content classifier 164 in categorizing the documents 154. The document identifier 150 may configure one or more thresholds and/or parameters of the document evaluator 230 based on the performance scores. In another embodiment, a user (such as an administrator 540) may configure one or more thresholds and/or parameters of the document evaluator 230 based on the performance scores.

Advantageously, embodiments of the invention identify a training document for a content classifier. In one embodiment, a document identifier defines one or more thresholds for designating a document as a training document. The document identifier may evaluate a plurality of documents to compute a score for each respective document. The score may represent how suitable the document is for training the content classifier with respect to a category. The document identifier may compute the scores based on content of the plurality of documents, metadata of the plurality of documents, link structure of the plurality of documents, user feedback received for the plurality of documents, and document metrics received for the plurality of documents. The document identifier may identify one or more training documents based on the computed scores. The document identifier may also train the content classifier using the one or more selected training documents. Thus, valid content (i.e., identified training documents) may be identified in an efficient and cost-effective manner for building and updating knowledge bases used by a content classifier. As a result, the cost of owning and operating a content classifier may also be reduced.

While the foregoing is directed to embodiments of the present invention, other and further embodiments of the invention may be devised without departing from the basic scope thereof, and the scope thereof is determined by the claims that follow.

What is claimed is:

1. A computer-implemented method to identify training documents satisfying a predefined set of suitability criteria for training a content classifier to classify documents as belonging to a category of a plurality of categories, the method comprising:

receiving a plurality of documents;

identifying, based on the predefined set of suitability criteria and by an application executing on one or more computer processors, a subset of the received plurality of documents as being suitable for training the content classifier to classify documents as belonging to the category, wherein one or more documents in the plurality of documents is excluded from the subset, wherein the application is configured to identify the subset based on any predefined set of suitability criteria selected from at least three of a predefined content rating threshold, a predefined set of suitable user-supplied tags, a predefined viewing frequency threshold, a predefined set of link structure criteria, and a predefined set of metadata criteria; and training the content classifier using each identified document as a positive training example representing the category, wherein the content classifier is not trained using said one or more documents excluded from the identified subset.

2. The computer-implemented method of claim 1, wherein identifying the subset of the received plurality of documents comprises:

determining a score for each document representing a measure of suitability for training the content classifier with respect to the category; and identifying one or more documents having a determined score exceeding a specified suitability threshold.

3. The computer-implemented method of claim 2, further comprising:

receiving user feedback for at least one of the received plurality of documents, wherein the subset of the received plurality of documents is identified based on the received user feedback.

4. The computer-implemented method of claim 3, wherein receiving user feedback for the plurality of documents comprises identifying one or more user-supplied tags linking at least one of the received plurality of documents with one or more categories, and wherein the subset of the received plurality of documents is identified based on the identified user-supplied tags.

5. The computer-implemented method of claim 4, further comprising:

receiving document metrics describing a viewing frequency of one or more of the received plurality of documents, wherein the subset of the received plurality of documents is identified based on the received document metrics.

6. The computer-implemented method of claim 5, wherein the operation further comprises:

identifying a link structure of the received plurality of documents, the link structure comprising links from one document to another and anchor text associated with each link, wherein the subset of the received plurality of documents is identified based on the links and associated anchor text.

7. The computer-implemented method of claim 6, further comprising:

subsequent to training the content classifier using each identified document as a positive training example representing the category, evaluating an effectiveness of the content classifier in evaluating whether one or more additional documents, not used as a training document, are representative of the category.

8. A non-transitory computer readable medium containing a program which, when executed, performs an operation to identify training documents satisfying a predefined set of suitability criteria for training a content classifier to classify documents as belonging to a category of a plurality of categories, the operation comprising:

receiving a plurality of documents;

identifying, by operation of one or more computer processors when executing the program and based on the predefined set of suitability criteria, a subset of the received plurality of documents as being suitable for training the content classifier to classify documents as belonging to the category, wherein one or more documents in the plurality of documents is excluded from the subset, wherein the program is configured to identify the subset based on any predefined set of suitability criteria selected from at least three of a predefined content rating threshold, a predefined set of suitable user-supplied tags, a predefined viewing frequency threshold, a predefined set of link structure criteria, and a predefined set of metadata criteria; and training the content classifier using each identified document as a positive training example representing the category, wherein the content classifier is not trained using said one or more documents excluded from the identified subset.

9. The non-transitory computer readable medium of claim 8, wherein identifying the subset of the received plurality of documents comprises:

determining a score for each document representing a measure of suitability for training the content classifier with respect to the category; and identifying one or more documents having a determined score exceeding a specified suitability threshold.

10. The non-transitory computer readable medium of claim 9, wherein the operation further comprises:

receiving user feedback for at least one of the received plurality of documents, wherein the subset of the received plurality of documents is identified based on the received user feedback.

11. The non-transitory computer readable medium of claim 10, wherein receiving user feedback for the plurality of documents comprises identifying one or more user-supplied tags linking at least one of the received plurality of documents with one or more categories, and wherein the subset of the received plurality of documents is identified based on the identified user-supplied tags.

12. The non-transitory computer readable medium of claim 11, wherein the operation further comprises:

receiving document metrics describing a viewing frequency of one or more of the received plurality of documents, wherein the subset of the received plurality of documents is identified based on the received document metrics.

13. The non-transitory computer readable medium of claim 12, wherein the operation further comprises:

identifying a link structure of the received plurality of documents, the link structure comprising links from one document to another and anchor text associated with each link, wherein the subset of the received plurality of documents is identified based on the links and associated anchor text.

14. The non-transitory computer readable medium of claim 13, wherein the operation further comprises:

subsequent to training the content classifier using each identified document as a positive training example representing the category, evaluating an effectiveness of the content classifier in evaluating whether one or more additional documents, not used as a training document, are representative of the category.

15. A system, comprising:
a processor; and
a memory containing a program, which when executed by the processor is configured to perform an operation to identify training documents satisfying a predefined set of suitability criteria for training a content classifier to classify documents as belonging to a category of a plurality of categories, the operation comprising:
receiving a plurality of documents;
identifying, based on the predefined set of suitability criteria, a subset of the received plurality of documents as being suitable for training the content classifier to classify documents as belonging to the category, wherein one or more documents in the plurality of documents is excluded from the subset, wherein the program is configured to identify the subset based on any predefined set of suitability criteria selected from at least three of a predefined content rating threshold, a predefined set of suitable user-supplied tags, a predefined viewing frequency threshold, a predefined set of link structure criteria, and a predefined set of metadata criteria; and
training the content classifier using each identified document as a positive training example representing the category, wherein the content classifier is not trained using said one or more documents excluded from the identified subset.

16. The system of claim 15, wherein identifying the subset of the received plurality of documents comprises:
determining a score for each document representing a measure of suitability for training the content classifier with respect to the category; and
identifying one or more documents having a determined score exceeding a specified suitability threshold.

17. The system of claim 16, wherein the operation further comprises:
receiving user feedback for at least one of the received plurality of documents, wherein the subset of the received plurality of documents is identified based on the received user feedback.

18. The system of claim 17, wherein receiving user feedback for the plurality of documents comprises identifying one or more user-supplied tags linking at least one of the received plurality of documents with one or more categories, and wherein the subset of the received plurality of documents is identified based on the identified user-supplied tags.

19. The system of claim 18, wherein the operation further comprises:
receiving document metrics describing a viewing frequency of one or more of the received plurality of documents, wherein the subset of the received plurality of documents is identified based on the received document metrics.

20. The system of claim 19, wherein the operation further comprises:
identifying a link structure of the received plurality of documents, the link structure comprising links from one document to another and anchor text associated with each link, wherein the subset of the received plurality of documents is identified based on the links and associated anchor text.

21. The system of claim 20, wherein the operation further comprises:
subsequent to training the content classifier using each identified document as a positive training example representing the category, evaluating an effectiveness of the content classifier in evaluating whether one or more additional documents, not used as a training document, are representative of the category.

22. The system of claim 21, wherein the content classifier is trained in order to improve accuracy of the content classifier in determining whether the one or more additional documents belong to the category, wherein the received user feedback comprises a content rating for at least one of the documents.

23. The system of claim 22, wherein the subset is identified upon determining that: (i) the content rating in the received user feedback satisfies the predefined content rating threshold; (ii) the one or more user-supplied tags match the predefined set of suitable user-supplied tags; (iii) the viewing frequency described in the received document metrics satisfies the predefined viewing frequency threshold; (iv) the identified link structure satisfies the predefined set of link structure criteria; and (v) metadata associated with the received plurality of documents satisfy the predefined set of metadata criteria.

24. The system of claim 23, wherein the predefined content rating threshold represents a count of occurrences of a predefined set of desired words occurring in the received plurality of documents, wherein the predefined set of link structure criteria specifies: (i) desired anchor text of incoming links from other documents; (ii) a desired count of incoming links from the other documents; and (iii) a desired count of incoming links to the other documents; wherein the predefined set of metadata criteria specifies a predefined set of desired words occurring in the metadata associated with the received plurality of documents.

* * * * *